(12) United States Patent
Marxkors et al.

(10) Patent No.: US 8,850,680 B2
(45) Date of Patent: Oct. 7, 2014

(54) INSTALLATION METHOD FOR A COMPONENT IN AN OPENING OF MATING COMPONENT

(75) Inventors: Andreas Marxkors, Hövelhof (DE); Francisco Tovar, Bielefeld (DE); Ralf Dörr, Bielefeld (DE)

(73) Assignee: Böllhoff Verbindungstechnik GmbH (DE)

( * ) Notice: Subject to any disclaimer, the term of this patent is extended or adjusted under 35 U.S.C. 154(b) by 540 days.

(21) Appl. No.: 13/176,185

(22) Filed: Jul. 5, 2011

(65) Prior Publication Data

US 2012/0000062 A1 Jan. 5, 2012

(30) Foreign Application Priority Data

Jul. 5, 2010 (DE) .......................... 10 2010 017 739

(51) Int. Cl.
*B23Q 17/10* (2006.01)
*B23P 19/06* (2006.01)
*F16B 37/12* (2006.01)
*B25B 27/14* (2006.01)
*G01L 5/24* (2006.01)

(52) U.S. Cl.
CPC ............... *F16B 37/12* (2013.01); *B25B 27/143* (2013.01); *G01L 5/24* (2013.01)
USPC .................. 29/407.02; 29/407.03; 29/407.05; 29/407.09; 29/407.1; 29/525.11; 29/240.5

(58) Field of Classification Search
CPC ......... G01L 5/24; B23P 19/107; B23P 19/12; B25B 27/143; B21H 3/00; B21F 3/04; F16B 37/122
USPC ............ 29/407.02, 407.03, 407.054, 407.09, 29/407.1, 525.11, 240.5; 173/183; 140/76, 140/71 C, 124; 411/438
See application file for complete search history.

(56) References Cited

U.S. PATENT DOCUMENTS

| | | | |
|---|---|---|---|
| 2,152,681 A | 4/1939 | Caminez | |
| 2,363,663 A | 11/1944 | Findley | |
| 2,874,741 A | 2/1959 | Brancato | |
| 3,031,004 A | 4/1962 | Brancato | |
| 3,459,248 A | 8/1969 | Waller | |
| 4,106,570 A * | 8/1978 | Eshghy et al. | ................ 173/183 |
| 4,553,303 A | 11/1985 | Yamamoto | |
| 4,563,119 A | 1/1986 | Cosenza | |

(Continued)

FOREIGN PATENT DOCUMENTS

| | | | |
|---|---|---|---|
| AU | 426 327 B2 | 7/1972 | |
| EP | 0752579 B1 | 4/2002 | |

(Continued)

OTHER PUBLICATIONS

European Search Report for EP 11172377.1; dated Oct. 14, 2011; 4 pages.

*Primary Examiner* — Jermie Cozart
(74) *Attorney, Agent, or Firm* — Hiscock & Barclay, LLP

(57) ABSTRACT

A threaded element in the shape of a wire thread insert with a specific geometric design is disclosed. This threaded element contains, in particular, a narrowed helical winding of at least two helical winding sections that enclose one or a plurality of sequential secants. Based on this geometric design of the threaded element, a matched installation process is described.

15 Claims, 12 Drawing Sheets

(56) References Cited

U.S. PATENT DOCUMENTS

Figure 1:
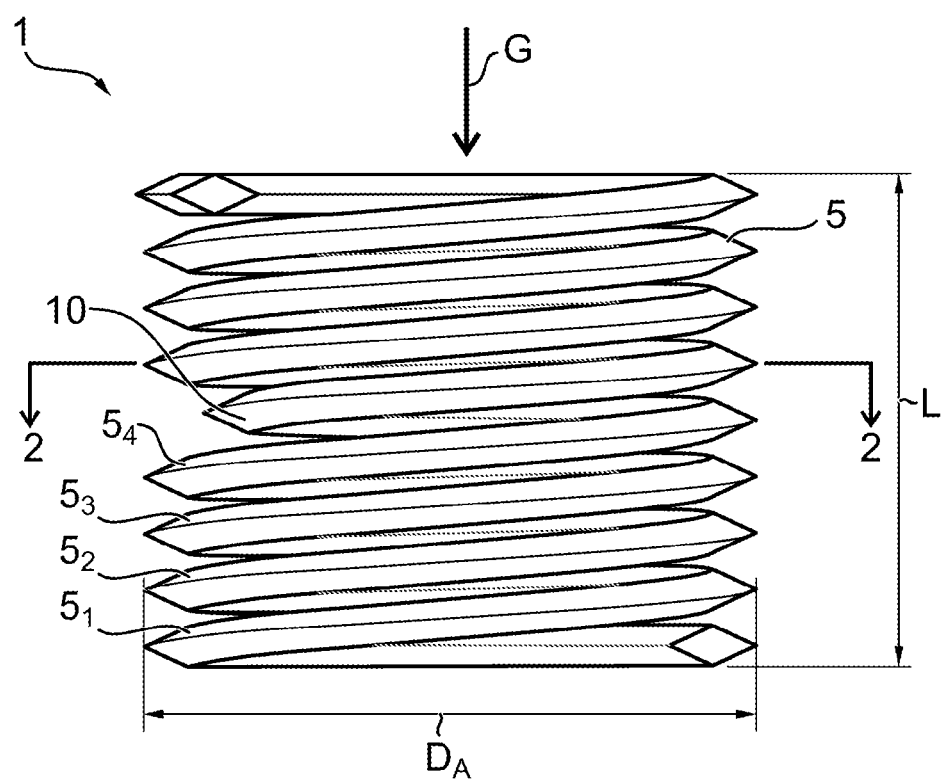

| | | |
|---|---|---|
| 4,645,398 A | 2/1987 | Cosenza et al. |
| 6,421,899 B1 | 7/2002 | Zitnay |
| 7,340,814 B2 * | 3/2008 | Bruehwiler et al. ....... 29/407.04 |
| 2005/0095083 A1 | 5/2005 | Masuda |
| 2008/0092357 A1 * | 4/2008 | Tovar et al. .................. 29/240.5 |
| 2009/0158569 A1 * | 6/2009 | Yui .............................. 29/240.5 |
| 2009/0317209 A1 | 12/2009 | Grubert et al. |
| 2011/0158769 A1 * | 6/2011 | Giannakakos et al. ....... 411/438 |

FOREIGN PATENT DOCUMENTS

| | | |
|---|---|---|
| EP | 1897659 A1 | 3/2008 |
| GB | 857 058 A | 12/1960 |
| JP | 2000-130424 A | 5/2000 |

* cited by examiner

INSTALLATION METHOD FOR A COMPONENT IN AN OPENING OF MATING COMPONENT

CROSS REFERENCE TO RELATED APPLICATIONS

This application is based upon German Patent Application No. 10 2010 017 739.3-24, filed on Jul. 5, 2010, the entire contents of which is being incorporated by reference herein.

1. FIELD OF THE INVENTION

The present invention relates to a threaded element, a screw with a threaded element, an installation method for a threaded element in an opening of a component, and a component with an installed threaded element.

2. BACKGROUND OF THE INVENTION

Threaded elements, which are also known as wire thread inserts, are generally known in the prior art. Threaded elements are made of different materials that vary depending on the respective application area. In addition, the threaded elements vary in their shape in order to support different varieties of installation.

There are two typical types of mounting for inserting the threaded element into an opening of a component that does or does not have receiving threads. With the one type of mounting, the helical wire of the threaded element has a driving notch. Using this driving notch, an installation tool drags the threaded element along and screws it into the receiving thread of the opening of the component. Examples of this are described in U.S. Pat. Nos. 4,563,119, 4,645,398 and U.S. Pat. No. 4,553,303. With the other type of mounting, one end of the threaded element has a diagonally progressing driver pin. The installation tool engages at this driver pin in order to drag the threaded element along and thereby screw it into the threads of the opening. This is described, for example, in U.S. Pat. No. 2,152,681, and U.S. Pat. No. 2,363,663. EP 1 897 659 on the other hand, describes a special installation spindle for installing threaded elements.

Threaded elements additionally have smaller windings with respect to their inner diameter which serve as a so-called screw-lock. For this purpose, U.S. Pat. No. 6,421,899 discloses one or more windings, which are formed as hexagons that are displaced radially inward within the threaded element. These screw-locks hold the screwed-in screws by means of a frictional connection, for example, in order to support a preassembled state.

The object of the present invention is to provide a threaded element that due to its design supports and simplifies the installation in a component compared to prior art. Similarly, a corresponding installation method is to be provided for threaded elements that are so designed.

3. SUMMARY OF THE INVENTION

The objective above is solved by a threaded element, a screw with the threaded element, an installation method for the threaded element, and by a component with the threaded element according to the following claims. Advantageous designs, preferred embodiments and further developments of the present invention arise from the description, the claims and the attached drawings.

The inventive threaded element in the shape of a wire thread insert has the following features: a) a plurality of sequential helical windings, whose radial interior, preferably also its radial exterior, is adapted in its shape to a thread, in which b) at least one narrowed helical winding consists of at least two helical winding sections which encompass one or a plurality of sequential secants that constrict the narrowed helical winding radial inwards.

The inventive threaded element has this specific shape in order to be installed together with a screw or an installation spindle into an opening of a component in an advantageous manner. As soon as the threaded element has been preassembled onto the screw or the installation spindle or generally onto an installation tool, the narrowed helical winding is pressed radially outward by the screw, for example. This radial outward pressing of the narrowed helical winding of the threaded element causes at least one part of the narrowed helical winding to extend radially outward beyond the outer diameter of the remaining threaded element. Due to this radially outward directed projection, while turning the screw with the threaded element into an opening of a component, a certain increased torque is required in comparison to the preceding part of the screw with the threaded element. If this increase of the torque is detected during the installation of the screw with the threaded element, it can be monitored in this manner up to the position where the threaded element has already having been turned in or screwed into the opening of the component.

In order to attain a reliable increase of the installation torque during the installation of the threaded element, the threaded element preferably comprises at least one narrowed helical winding having at least three helical winding sections, in which at least at two locations enclose one or a plurality of sequential secants. Preferably, there are also at least two narrowed helical windings that are disposed apart from each other in the longitudinal direction of the threaded element. This specific embodiment guarantees that two or more increases can be detected during the capturing of the installation torque of the screw with threaded element, in order to make different installation positions of the threaded element in the opening of the component visible for the worker.

According to a further embodiment, one of the narrowed helical windings is disposed within the last one to four helical windings with respect to the thread direction of the threaded element. According to a further embodiment, one narrowed helical winding is disposed in a middle region relative to a length of the threaded element.

According to the invention, a further threaded element is proposed that even without a screw or installation spindle guarantees the same function as with the threaded element described above. This threaded element in the shape of a wire thread insert has the following features: a plurality of sequential helical windings whose radial interior, preferably also its radial exterior, is adapted in its shape to a thread, in which b) at least one widened helical winding is composed of at least two helical winding sections that enclose one or a plurality of sequential bulges, which expand the widened helical winding radially outwards.

Compared to the threaded element described above with the narrowed helical winding, the narrowed helical windings are replaced by widened helical windings. Instead of secants, these widened helical windings use one or a plurality of radial outward directed bulges that project beyond the outer diameter of the remaining threaded element. In this manner, the widened helical windings already create an increase of the installation torque as soon as they are screwed into the opening of the component. From this, it follows that an increase of the installation torque of the threaded element can also be generated without a preinstalled screw or installation spindle.

In a preferred design of this threaded element with widened helical winding, the at least one widened helical winding comprises at least three helical winding sections which enclose one or a plurality of sequential bulges at least two locations. In addition, there are preferably at least two widened helical windings in the threaded element that are disposed spaced from each other in the longitudinal direction of the threaded element. In a further preferred design, additionally one of the widened helical windings is disposed within the last one to four helical windings relative to the thread direction of the threaded element, whereas a further widened helical winding is preferably disposed in the middle region with respect to a length of the threaded element.

Furthermore, the present invention discloses an installation method for a screw with threaded element, or an installation spindle with threaded element, or an installation tool with a threaded element, into an opening with an internal thread of a component, where a pitch per rotation of the internal thread is known. This installation method has the following steps; a) screwing the screw with threaded element, the installation spindle with threaded element, or the installation tool with threaded element into the internal thread of the opening of the component, b) capturing a screw-in torque and an angle of rotation of the threaded element during the screwing in, c) determining a position of the threaded element in the opening from a first covered angle of rotation after a first increase of the screw-in torque from a base screw-in torque to a first screw-in torque, which signals an entry of the narrowed helical winding of the threaded element or the widened helical winding of the threaded element in the opening, and the pitch of the thread.

The inventive installation method is based on the fact that both the angle of rotation as well as the screw-in torque are captured during installation of the threaded element. Using the capture of the screw-in torque, it can be determined when the narrowed helical winding sitting on the screw or the installation spindle, or when the widened helical winding, is rotated into the opening of the component, because the screw-in torque increases in the process. During the installation process it is possible to reliably recognize when this specific region of the threaded element enters into the opening of the component because due to the shape of the threaded element the increase of the screw-in torque can be defined adjustably. If after this increase of the screw-in torque, the angle of rotation covered by the threaded element is captured, then it is known how far the threaded element has already been installed into the opening of the component. The position of the threaded element results from the product of the angle of rotation and the pitch of the internal thread of the opening of the component.

For the further design of the installation method, it is preferred to define a maximum torque and to terminate the screwing-in of the threaded element upon attaining the maximum torque. In this context, the maximum torque, or an appropriate torque threshold to be defined for this purpose, serve to capture a contact of the threaded element with a bottom of the opening of the component, for example. In the same way, it is possible in this manner to detect that the head of the screw with the threaded element rests on, or runs up against, the component.

If the threaded element with a screw has a plurality of narrowed helical windings, or the threaded element has a plurality of widened helical windings, it is preferable to capture a second increase of the screw-in torque, which signals an entry of a further narrowed or widened helical winding of the threaded element into the opening of the component, in order to determine, on this basis, the position of the threaded element in the opening of the component.

In addition, the present invention comprises a component having an opening with an internal thread and a threaded element or a threaded element with the screw installed therein. In order to support the installation of the threaded element in the opening of the component, it is preferred to provide a cylindrical insertion surface without internal thread at the entry of the opening. This cylindrical insertion surface facilitates the initial contact and alignment of the threaded element with respect to the opening, and facilitates the subsequent screwing-in.

In addition, the present invention comprises a winding spindle for producing a threaded element from a wire. The winding spindle has the following features: a fastening head using which the winding spindle can be fastened, and a threaded section which has at least one recess in the shape of a secant or an elevation in the shape of a bulge. The threaded section of the winding spindle comprises a plurality of thread turns. Preferably, a recess or an elevation, or a plurality of abutting recesses or elevations, are disposed within a thread turn of the threaded section. It is further preferred to dispose a plurality of individual recesses or elevations, or repeatedly a plurality of recesses or elevations distributed in an axial direction along the threaded section. According to another embodiment, the at least one recess or elevation, or plurality of recesses or elevations, is enclosed by two spindle thread sections.

The present invention additionally discloses a manufacturing method for a threaded element, in particular a threaded element as already described, that has the following steps: arranging the wire to be wound on a winding spindle with at least one recess or elevation in a thread section, preferably a winding spindle according to the prior description, rotating the winding spindle so that the wire to be wound is wound up on the winding spindle, and the at least one recess or elevation in the thread section forms at least a secant or a bulge, and separating the wire to be wound from the wire wound on the winding spindle, so that a threaded element is present, and unwinding the threaded element from the winding spindle.

4. BRIEF DESCRIPTION OF THE ACCOMPANYING DRAWINGS

Figure 2A:
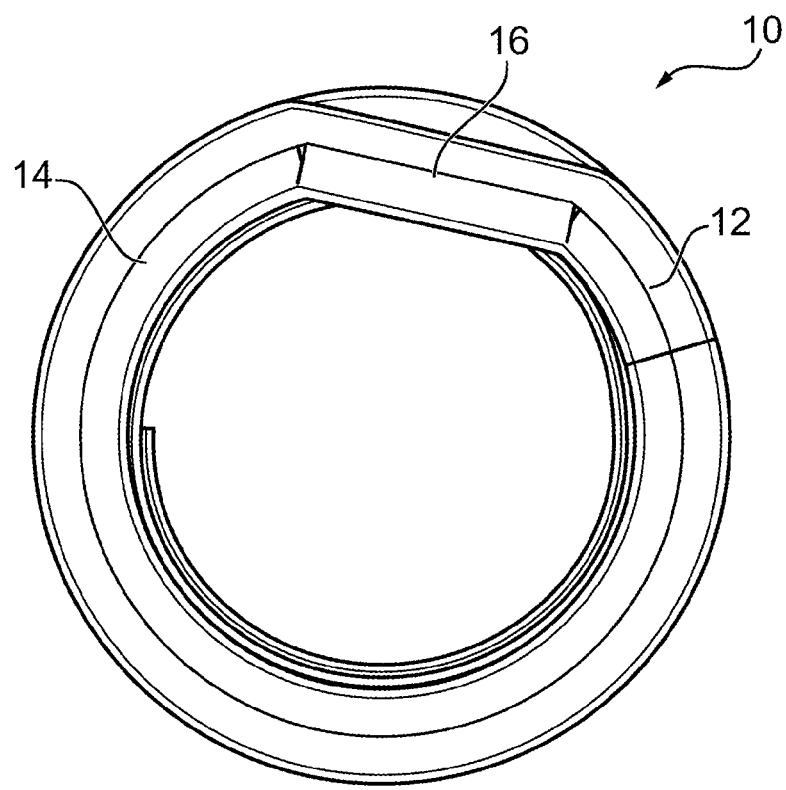
Figure 2B:
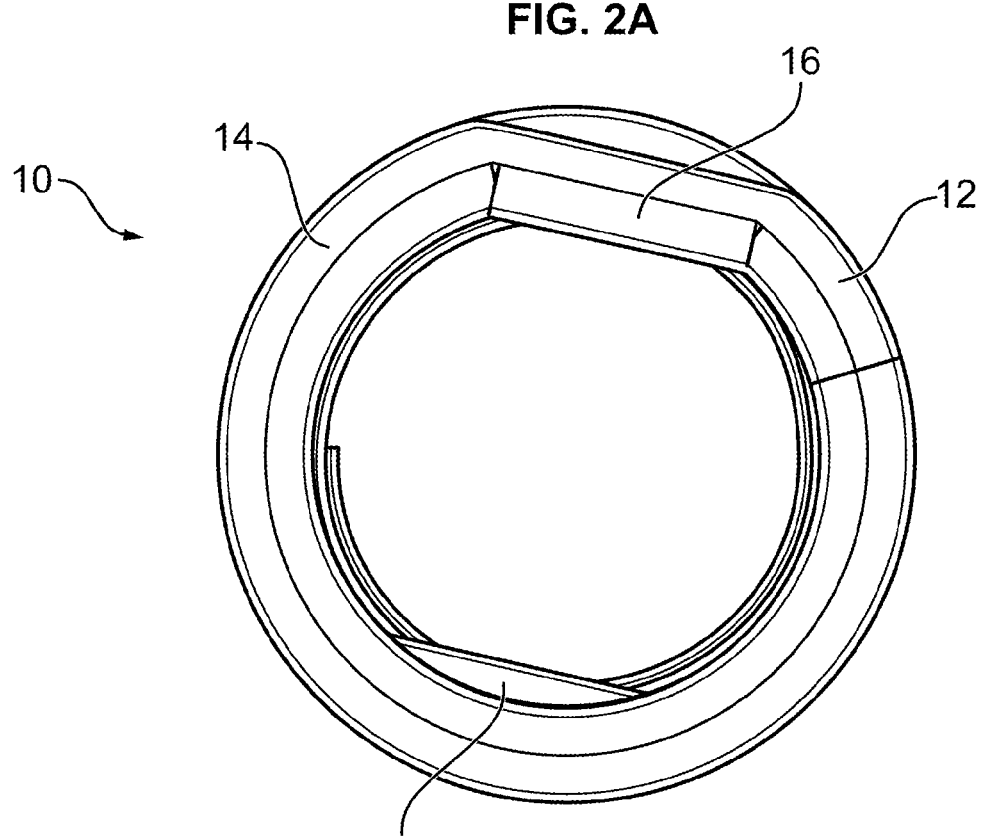
Figure 2C:
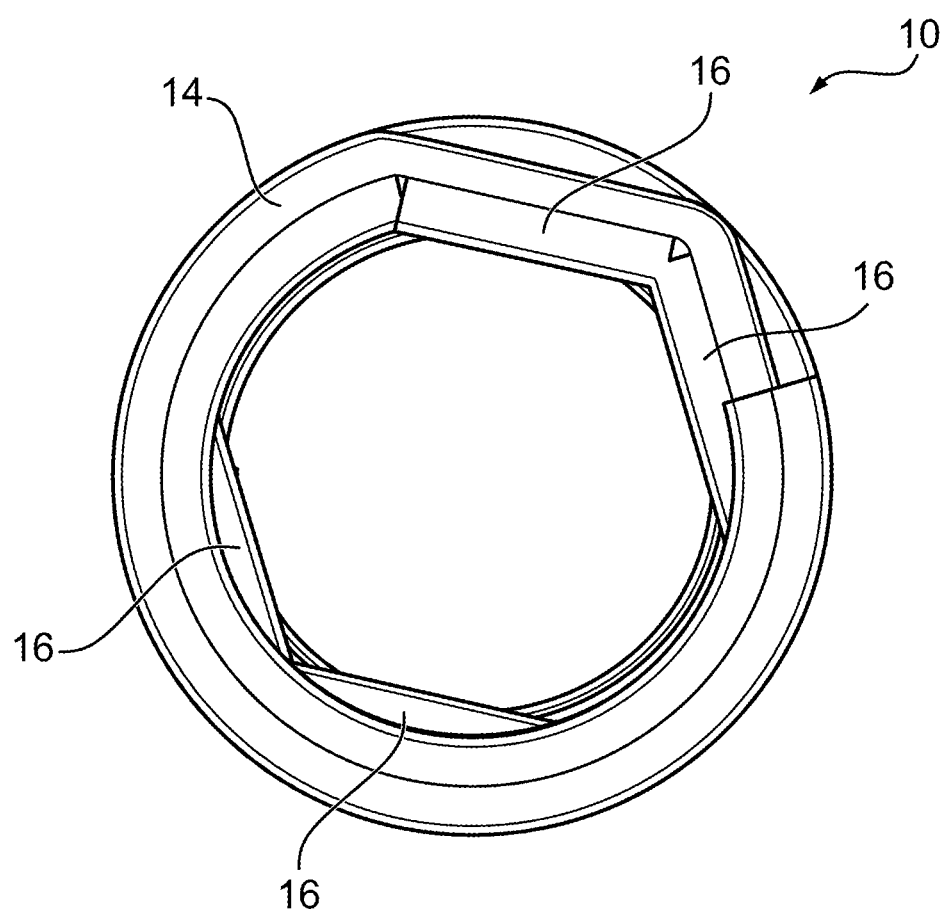
Figure 3:
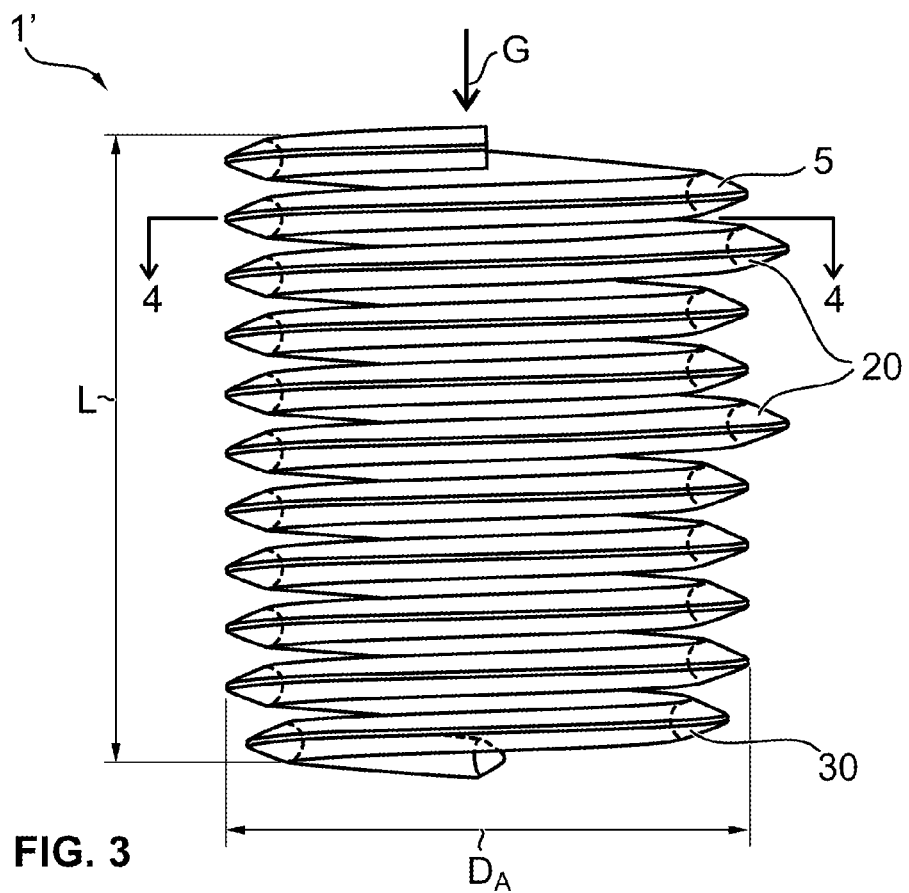
Figure 4:
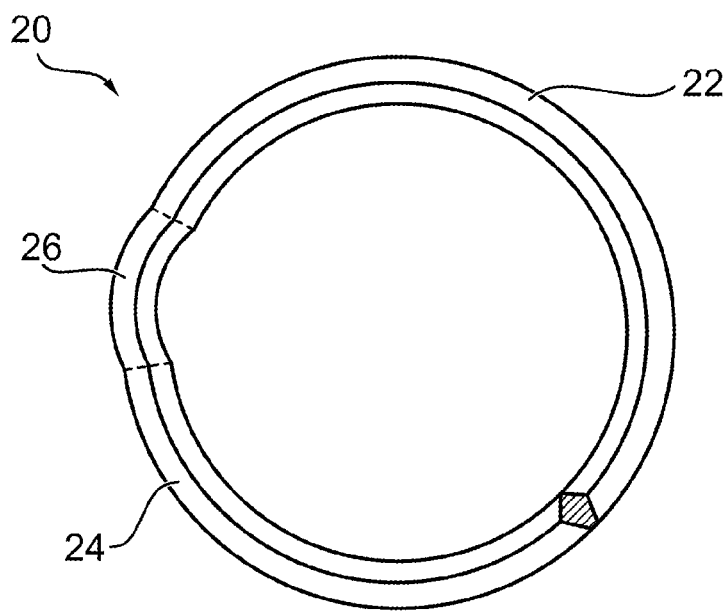
Figure 5:
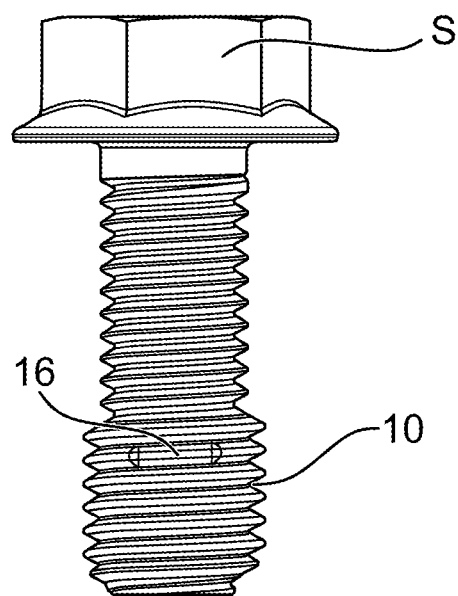
Figure 6:
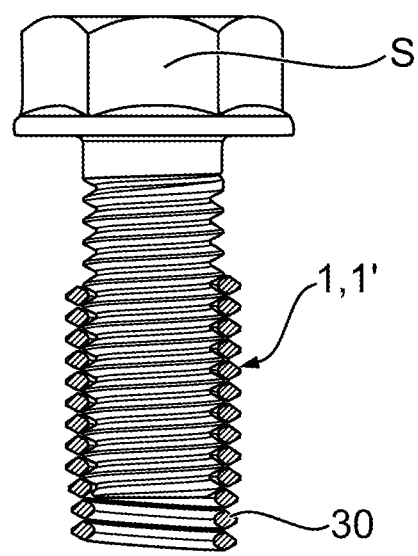
Figure 7:
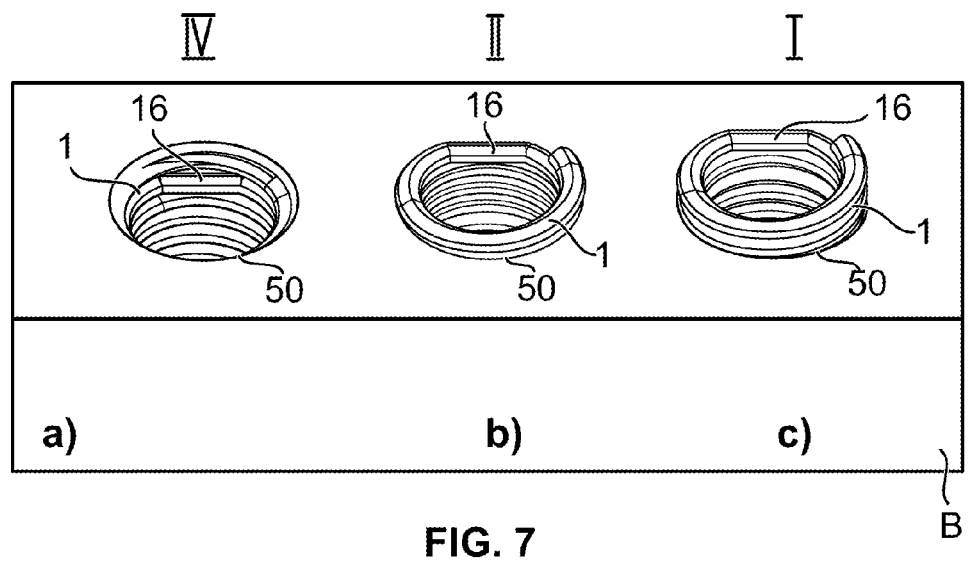
Figure 8:
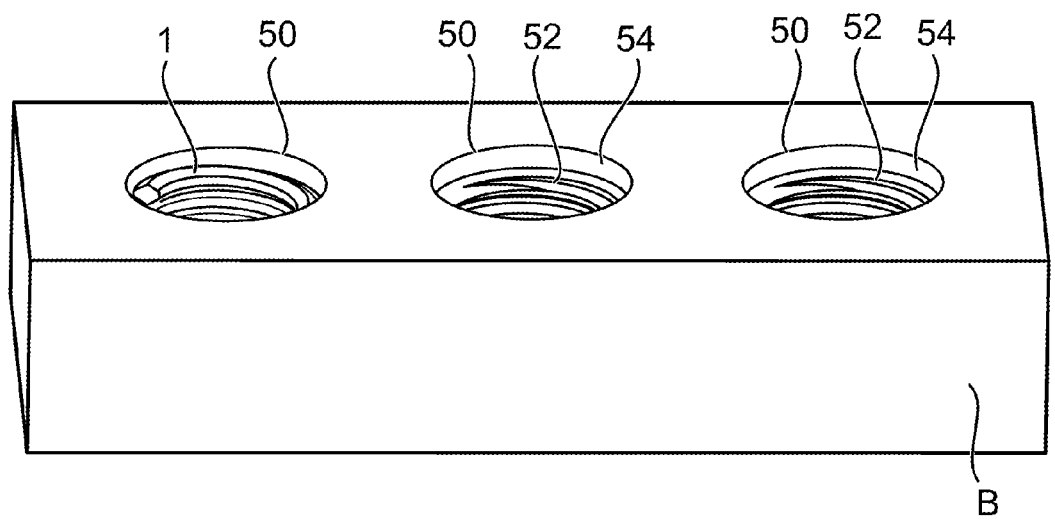
Figure 9:
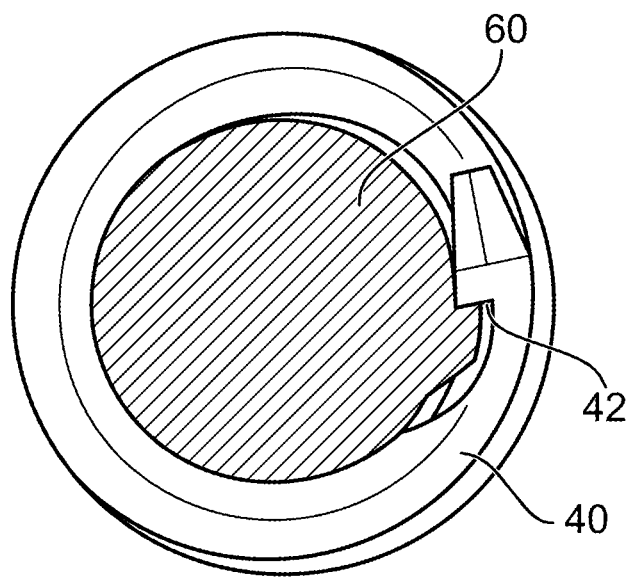
Figure 10:
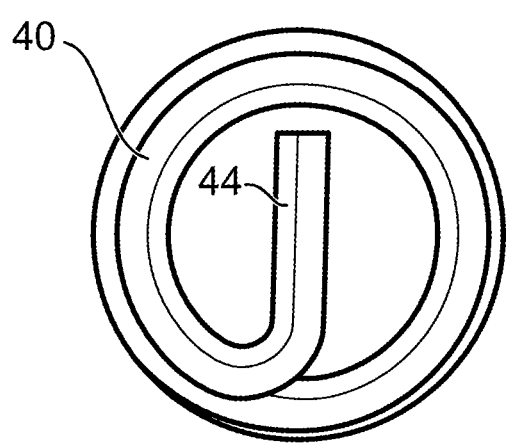
Figure 11:
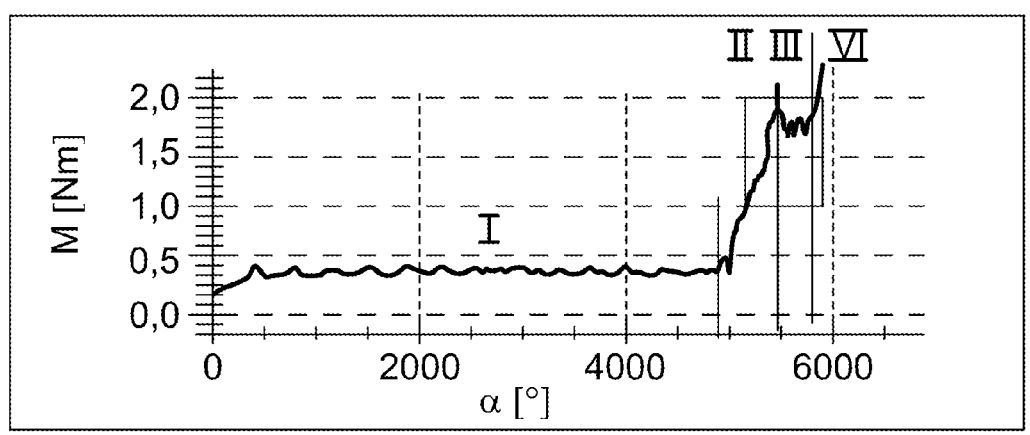
Figure 12:
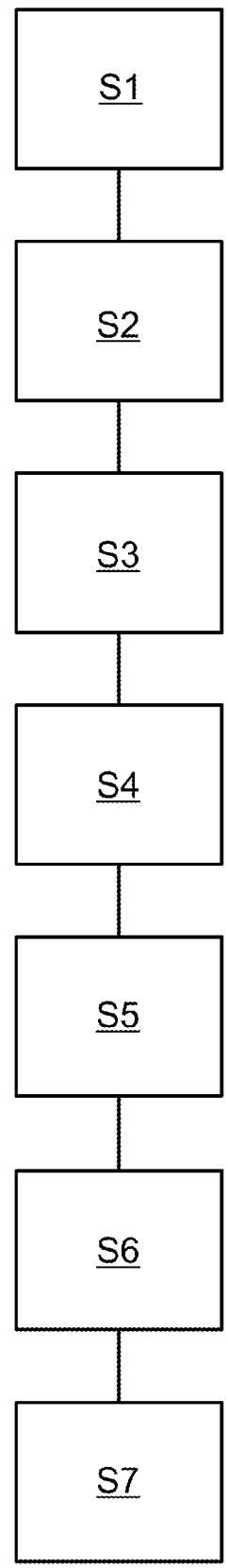
Figure 13:
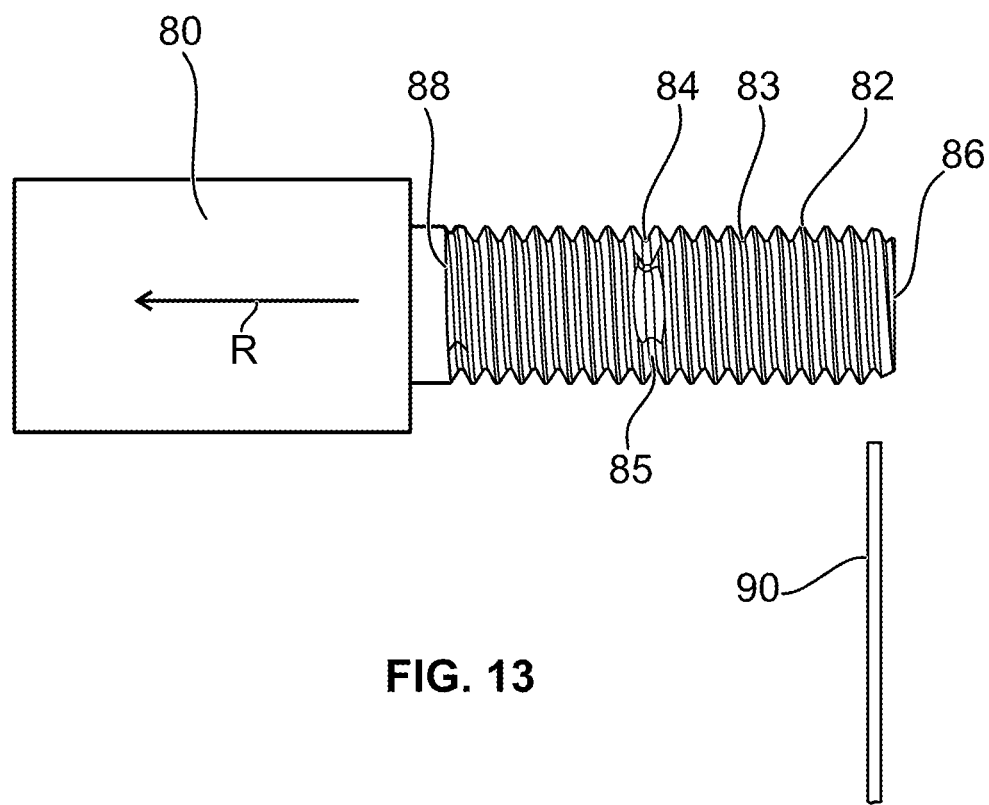
Figure 14:
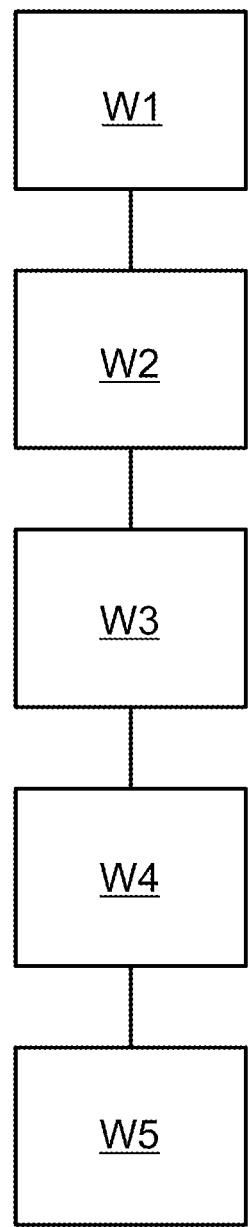

Preferred embodiments of the present invention are explained in more detail in reference to the accompanying drawings, in which:

FIG. 1 depicts a preferred embodiment of the threaded element having a narrowed helical winding, FIG. 2A is a sectional view along the line from FIG. 1, FIG. 2B is a sectional view along the line from FIG. 1 of a further preferred embodiment of the threaded element having several individual narrowed helical windings distributed in the axial direction, FIG. 2C is a sectional view along the line from FIG. 1 of a further preferred embodiment of the threaded element having a plurality of narrowed helical windings abutting against each other, FIG. 3 is a preferred embodiment of the threaded element having two widened threaded elements spaced from each other, FIG. 4 is a sectional view along the line from FIG. 3, FIG. 5 is a screw with a pre-assembled threaded element according to FIG. 1, FIG. 6 is a preferred embodiment of a screw with threaded element that at its end facing away from the screw head has a plurality of windings narrowed in their diameter, FIG. 7 depicts different installation steps of a threaded element into an opening of a component, FIG. 8 illustrates a preferred component having openings with internal threads and insertion surfaces, FIG. 9 is a preferred end of a threaded element having a driving notch, FIG. 10 is a preferred end of a threaded element having a driving pin, FIG. 11 is an example representation of a screw-in torque depending on the angle of rotation of the threaded element during its installation in the opening of the component, FIG. 12 is a flow diagram of the preferred installation method of the present invention, FIG. 13 is a preferred embodiment of the winding spindle for producing the threaded element, and FIG. 14 is a flow diagram of the preferred production method of the threaded element.

5. DETAILED DESCRIPTION OF THE PREFERRED EMBODIMENTS

The inventive threaded element 1; 1' has the shape of a wire helix, which is implemented as a spiral spring. The wire helix is composed of a plurality of adjacent helical windings 5. The helical windings 5 and thus, the entire threaded element 1; 1' have an internal diameter and an external diameter, DA. In addition, the threaded element 1; 1' has a specific length L depending on the use case.

The helical windings 5 preferably have a cross-section in the shape of a diamond. As a result, a shape adapted to a thread is given at both the radial interior and exterior of the helical windings 5. It is also preferred that only the radial interior of the threaded element 1; 1' provides a thread shape. In this case, the radial exterior of the threaded element 1; 1' is designed arbitrarily and implements an anchoring or material displacing function in the material of a component B, for example.

The wire helix is preferably composed of a spring steel or another elastic material of high strength.

The threaded element 1; 1' of the present invention due to its specific shape, requires during its screwing-in or installation in an opening 50 of the component B, at least a first screw-in torque M1 after a base screw-in torque M0. Because during the installation of the threaded element 1; 1', its angle of rotation is also captured, the position of the threaded element 1, 1' in the opening 50 of the component B can be determined from the torque progression and the angle of rotation. This allows reliable process monitoring and quality assurance during the installation already through the use of a standard screwing tool with capture and evaluation of the torque and angle of rotation. For this purpose, the threaded element 1 according to FIG. 1 has at least one narrowed helical winding 10. FIG. 2 shows a top view of the narrowed helical winding 10 from FIG. 1.

The narrowed helical winding 10 comprises at least two helical winding sections 12, 14. The winding sections 12, 14 enclose a secant 16 which narrows the otherwise circular helical winding 10 radially inward (see FIG. 2A). It is also preferred, instead of only one secant 16, to string together a plurality of secants 16 between the winding sections 12, 14, as shown in FIG. 2C. According to a further embodiment, two or more individual (see FIG. 2B) or two or more pluralities of secants 16 (not shown) are spaced from each other by helical winding sections 12, 14. It is also preferable to arrange more than two separate secants 16 or secant groups in the narrowed helical winding 10.

FIG. 1 shows the threaded element 1 with a specific length L. Preferably, at least one narrowed helical winding 10 is disposed in the middle region relative to the length L of the threaded element 1. In addition to this, it is advantageous to dispose a further narrowed helical winding 10 at a distance to the middle region of the threaded element 1. According to a preferred embodiment, one of the narrowed helical windings 10 is disposed within the last one to four helical windings 5 with respect to the thread direction G of the threaded element 1. The advantage of this construction is explained later in conjunction with the installation method of the threaded element 1.

According to a further optional design, the threaded element 1 has a plurality of sequential helical windings 30, as are shown, for example, in FIG. 6. This plurality of helical windings 30 preferably comprises two to five windings 30. These are disposed at the start of the threaded element 1 as seen in its thread direction G. The helical windings 30 have a smaller diameter than the outer diameter DA of the threaded element 1. In this manner, the windings 30 are in a position to produce a greater frictional connection to a screw S, an installation spindle 60 or another installation tool, for example, than the remaining helical windings 5 of the threaded element 1 with the outer diameter DA. Due to this increased frictional connection, the installation of the threaded element 1 in the component B is supported, because the threaded element 1 is better retained on the screw S, the installation spindle 60, or another installation tool. Whereas already one individual of the windings 30 would be sufficient to fasten the threaded element 1 on the screw S, for example, through at least one additional winding 30 the retention of the threaded element 1 is additionally supported on the screw S. The background for this is that during screwing-in the screw S with threaded element 1 into an opening 50 of the component B, the first winding 30 can encounter resistance. Such resistance is, for example, a burr or contamination in the internal thread 52 of the opening 50. Due to this resistance, the first winding 30 is blocked and partially widened during screwing into the opening 50. Thereby, the frictional connection between the screw S and the first winding 30 is reduced. However, because at least one further winding 30 is provided in the threaded element 1, this secures a reliable retention of the threaded element 1 on the screw S. Preferably, the at least one further winding 30 is disposed directly adjacent to the first winding 30. It is also preferred to dispose the at least one further winding 30 with several windings apart from the first winding 30 (not shown). In the same manner, it is preferred to provide subsequent groups of windings 30 spaced from each other. When one or more groups can be used, these contain one to five windings 30. Using this arrangement of the windings 30 guarantees that due to the force fit connection between the screw S and the threaded element 1, the friction between the internal thread 52 and the threaded element 1 determines the screw-in torque of the screw S. The threaded element 1 cannot be loosened and/or blocked due to a resistance in the internal thread 52, so that only the friction between screw S and threaded element 1 determines the measurable screw-in torque (see below). This guarantees a reliable installation of the threaded element 1 into component B.

The threaded element 1 according to FIG. 1 is installed using a screw S (see FIGS. 5 and 6), an installation spindle 60 (see FIG. 9), or a similar installation tool, into the opening 50 of the component B. After screwing the threaded element 1 onto the screw S, the narrowed helical winding 10 is pressed radially outward by the screw S. In this state, the narrowed helical winding 10 extends beyond the outer diameter DA of the threaded element 1. This radially outward directed projection depends on the number and dimension of the secants 16. The increase of a screw-in torque M during the entry of the narrowed helical winding 10 into the internal thread 52 of the component B can be purposefully adjusted depending on the dimensioning of the projection.

If the screw S with the threaded element 1 is now screwed in the thread direction G into the opening 50 of the component B, the first helical windings 51 to 54 require a base screw-in torque M0. The screw-in torque M increases to a first screw-in torque M1 as soon as the narrowed helical winding 10 with the radially outward directed projection enters in the internal thread 52 of the opening 50. Correspondingly, the screw-in torque M changes further in a defined manner when further narrowed helical windings 10 with radially outward directed projections arrive in the internal thread 52 of the opening 50.

FIG. 3 shows an alternate design of a threaded element V. This threaded element 1' does not need to be installed with a screw S or an installation spindle 60 into the component B. Despite this, due to its design it yields same change of the screw-in torque during the installation as with the threaded element 1 (see above).

The threaded elements 1 and 1' of FIGS. 1 and 3 differ only in that the threaded element 1' used a widened helical winding 20 instead of the narrowed helical winding 10. Whereas the helical winding sections 22, 24 correspond in shape, arrangement and number to the different embodiments of the helical winding sections 12, 22, the at least one secant 16 is replaced by at least one bulge 26. The bulge 26 extends radially outward beyond the outer diameter DA of the threaded element V. This radially outward directed projection is created either by one or a plurality of combined bulges 26, or by several separate bulges 26, or groups of bulges 26. As already mentioned above, the bulges 26 and the widened helical windings 20 are disposed in the same manner as the secants 16 and the narrowed helical windings 10 (see FIGS. 2A, 2B, 2C), even if this is not shown. In the same manner, the threaded element 1' preferably also comprises the windings 30 tapered in comparison to the outer diameter DA. These in turn, serve to support the fixing of the threaded element 1' at an installation tool by an increased frictional connection in comparison to the prior art.

If the threaded element 1' is screwed into the internal thread 52 of the opening 50 of the component B, the at least one widened helical winding 20 creates the same effect as the narrowed helical winding 10 after preinstallation on the screw S. Therefore, for further information, see the explanation above for the threaded element 1.

For supporting the installation of the threaded elements 1; 1', they each preferably have a driving notch 42 or a driving pin 44 in the first winding 40 as viewed in the thread direction G, as shown in the FIGS. 9 and 10.

The threaded elements 1; 1' are installed in the opening 50 of the component B. The opening 50 comprises the internal thread 52 that is to be reinforced by the threaded element 1; 1'. The opening 50 at its entrance preferably has a cylindrical insertion surface 54 without internal threads 52. Using the insertion surface 54, the threaded element 1, 1' can be initially aligned with respect to the opening 50. In addition to this, the insertion surface 54 supports the entry of the threaded element 1; 1' because a starting canting of the threaded element 1; 1' in the opening 50 is avoided.

The installation method of the threaded element 1; 1' in the component B is described using FIG. 7, the screw-in torque-angle of rotation diagram in FIG. 11 and the flow diagram in FIG. 12. The threaded element 1 is installed in the component B with the screw S as an example for the two threaded elements 1; 1'. The threaded elements 1; 1' could be assembled into the internal thread 52 of the opening 50 in the same manner using an installation spindle 60, or a known installation tool.

Different stages of the installation are shown in FIGS. 7a, 7b, 7c. For improved clarity, in each case the screw S with which the threaded element 1 is installed, is not shown. Because the screw S is not shown, the position of the secants 16 of the narrowed helical winding 10 can be recognized with respect to the internal thread 52.

In FIG. 7c, a part of the threaded element 1 has entered in the internal thread 52, however, the secant 16 has not yet entered. In FIG. 7b, the secant 16 has just been received by the internal thread 52, and in FIG. 7a, threaded element 1 is completely installed in the opening 50 of the component B.

In step S1 of the installation method, initially the threaded element 1 is screwed into the internal threads, 52 without a narrowed helical winding 10 already been screwed in. Due to the friction between the internal thread 52 and the threaded element 1, a base screw-in torque M0 is required in order implement this screw-in according to FIG. 7c. The first phase I is identified in FIG. 11. It requires an example base screw-in torque M0 of 0.4 Nm over an angle of rotation a of 4.800°.

As can be seen in the diagram in FIG. 11, during the screw-in procedure or during the installation method, both the screw-in torque M and the angle of rotation α are captured online and evaluated. This is feasible using a standard electric screwdriver. With such electric screwdrivers, immediate access to the screw-in torque and angle of rotation realized by the electric screwdriver is possible via a connection to a control and evaluation unit.

In a second phase II, the secant 16 is screwed into the internal thread 52. Because the secant 16 creates a radially outward enlargement of the winding 10 on the screw S, the screw-in torque M increases during entry of the secant 16 in the internal thread 52. As soon as the secant 16 is completely entered in the internal thread 52, a plateau is reached in the screw-in torque—angle of rotation curve. In this phase II, therefore the screw-in torque M increases from the base screw-in torque M0 to a first screw-in torque M1 at the level of the plateau of the screw-in torque —angle of rotation curve. This state is shown in FIG. 7b.

This first screw-in torque M1 could also be captured when a widened helical winding 20 of the threaded element 1' would enter in the internal thread 52.

The pitch of the internal thread 52 of the component B is known. The thread height indicates the path that the screw must travel during a complete rotation within the internal thread 52. If the pitch of the internal thread 52 is multiplied by the captured angle of rotation a after its division by 360°, the distance that the threaded element 1 traveled into the opening 50 is obtained. In addition, the position at which the winding 10 with secant 16 is disposed relative to the length L of the threaded element 1 is known. The attainment of the first screw-in torque M1 at a specific angle of rotation α at the end of phase II therefore offers the possibility to check whether the threaded element 1 has been entered correctly in the internal thread 52, and what position it has attained. At the end of phase II (see FIG. 7b), the product of the pitch of the internal thread 52 and the quotient of the angle of rotation α divided by 360° must equate to the position of the winding 10 relative to the length L of the threaded element 1.

If the screw-in procedure continues, and no further winding 10 is entered into the internal thread 52, the screw-in torque M remains at the plateau value of the first screw-in torque M1. If a further winding 10 were to be entered in the internal thread 52, a further increase of the screw-in torque M up to a second screw-in torque M2, analogously to phase II, would be captured (step 4, not shown). This further increase of the screw-in torque M and the subsequent plateau value at a specific angle of rotation a can be used again for the purpose of determining and checking the position of the threaded element 1 in the opening 50.

If the threaded element 1; 1' is completely installed, the threaded element 1; 1' contacts, for example, the bottom of the opening 50, or the head of the screw S rests on the surface of the component B. At this moment, the screw-in torque M increases steeply (phase IV) and exceeds a previously defined maximum screw-in torque threshold value. Upon exceeding the torque threshold value, the installation procedure according to a preferred embodiment is automatically terminated. Furthermore, it is preferable at this point to again calculate the position of the threaded element within the opening 50 using the angle of rotation a, in order to confirm the end of the installation.

According to the described installation procedure, the screw-in torque M and the angle of rotation α are preferably continuously captured during the screwing-in or in general during the installation of the threaded element 1; 1', into the opening 50 of the component B. On this basis, it is preferred to define a process window P in order to make the installation of the threaded element 1; 1' easier for the worker. The process window P is illustrated as an example in FIG. 11.

The process window P is defined at least by a minimum angle of rotation αP1 and a minimum screw-in torque MP1. It is additionally preferred to further define a maximum angle of rotation αP2 and a maximum screw-in torque MP2. These four values αP1, MP1, αP2 and MP2, to be determined by the worker before the installation of the threaded element 1; 1', span the process window P shown in FIG. 11.

If the electrical screwdriver, or a control connected to it, used during the installation method, captures that the minimal limits αP1 and MP1 of the process window P were exceeded, than this is captured as the attainment of the minimum installation target. On this basis, according to one embodiment, the installation result of the threaded element 1; 1' is rated as "OK".

It is further preferred that the process window P is dimensioned and disposed in the screw-in torque-angle of rotation space so that the screw-in torque M attains the plateau value of phase III within the process window P. This plateau value signals the entry of the last narrowed helical winding 10, or the last widened helical winding 20, as seen in the thread direction G, in the internal thread 52 of the opening 50, with a specific angle of rotation α, as was described above in detail. In this context, it is preferred to dimension the process window P so that the plateau value, or phase III, lies completely within the process window P. Thus, if the attainment of the plateau value of the screw-in torque of phase III is captured within the process window P, the installation can on this basis preferably be rated likewise as "OK", because the last winding 10; 20 is completely integrated within the internal thread 52. If the plateau value of phase III is not attained within the process window P, or if the plateau value continues outside of the process window P at higher values of the angle of rotation than the maximum angle of rotation limit αP2, the installation is rated as "not OK".

According to a further preferred design of the installation method, the screw-in torque M is to exceed the defined maximum threshold value (see above) before the maximum angle of rotation limit αP2 is attained—thus, within the process window P. If this is the case, the installation process is rated as "OK", and automatically ended. If the maximum threshold value of the screw-in torque is not exceeded, the threaded element 1; 1' has not yet attained its final position, and therefore, the installation cannot be rated as "OK". The installation is preferably continued or canceled, or the worker is signaled that the installation method is leaving the process window P. In this case, the worker could monitor the further installation method instead of the automatic control.

It is likewise preferred that instead of an automatic completion of the installation method by the control, that the completion of the installation procedure is signaled to the worker so that the worker ends the installation method.

If the plateau value of the screw-in torque of phase III or the maximum threshold value of the screw-in torque is not attained within the process window, the installation is rated as "not OK", and automatically canceled or a cancellation is signaled.

It is understood that the above conditions can be used individually or in any arbitrary combination. Is also preferred to dimension the process window P shown in FIG. 11 differently, and to dispose it differently in the screw-in torque-angle of rotation space differently. Thus, for example, the limits of the process window P can be moved so that along with the phases II, III, IV also a part of phase I of the screw-in torque-angle of rotation curve is contained in the process window.

The present invention additionally discloses a winding spindle 80 as is seen in FIG. 13 according to a preferred embodiment. The winding spindle 80 comprises a fastening head, by means of which the winding spindle 80 can be fastened. This fastening head is connected to a motor or a drive section, for example, such that the rotary movement of the motor or the drive section can be transferred to the winding spindle.

Furthermore, the winding spindle 80 comprises a thread section 82. The thread section 82 is formed by a plurality of spindle thread turns 83. According to a preferred embodiment, at least one spindle thread turn 83 comprises a recess 84 in the shape of a secant or an elevation (not shown) in the shape of a bulge, as are formed later into the threaded element 1; 1'. In the same manner, the thread turn preferably has a plurality of adjacent recesses 84 or bulges (not shown). It is also preferred that several spindle thread turns 83 each have a recess 84 or bulge or a plurality of recesses 84 or bulges, distributed over the length of the thread section 82.

The winding spindle 80 serves to wind a wire 90 on the winding spindle 80, specifically the thread section 82, in order to produce a threaded element 1; 1'. Therefore, if the wire 90 is wound on the thread section 82, on the one hand, it takes on the shape of the thread section 82 in order to form a wire helix. Furthermore, the wire 90 to be wound is formed complementary to the recesses 84 or bulges (not shown) that are present. Threaded elements 1, 1' are produced corresponding to the FIGS. 1 to 4 and the description above, based on the number and arrangement of the recesses 84 or bulges (not shown). Even if it is not described in detail or shown, the thread section 82 can be formed complementary to the different preferred threaded elements 1, 1' (see above), in order to be able to produce these using the winding spindle 80.

The thread section 82 has in addition a thread direction R, indicated by the arrow in FIG. 13. While winding the wire 90 onto the winding spindle 80, during the rotation of the winding spindle 80, the winding spindle 80 is moved either counter to the thread direction R. Or during the rotation of the spindle 80, the wire 90 moves in its perpendicular alignment to the longitudinal axis of the winding spindle 80 in thread direction R. Naturally, it is also preferred during the winding of the wire 90 onto the winding spindle 80 to simultaneously move the winding spindle 80 counter to the thread direction R, and the wire 90 in the thread direction R.

Beyond this, the present invention discloses a production method for a threaded element 1; 1', as was described above. This production method preferably has the steps according to the flow diagram in FIG. 14. For producing the threaded element 1; 1', the winding spindle 80, already described above, is preferably used according to FIG. 13, upon which a wire 90 to be wound is wound. In step W1, first, a suitably formed winding spindle 80, corresponding to the desired shape of the threaded element 1; 1' to be produced, and an appropriate wire 90 are selected and prepared. Specifically, the winding spindle 80 preferably has a varying number and distribution of the recesses 84 or bulges. In addition, the thread shape of the thread section 82 can vary, which provides the later shape of the threaded element 1; 1'.

In the next step, W2, the end of the wire 90 to be wound (see FIG. 13) is placed on a first end 86 of the thread section 82 of the winding spindle 80. It is also conceivable to place that end of the wire 90 to be wound on the end 88 of the thread section 82 in order to be able to subsequently wind it on the thread section 82. After the placement in step W2, the wire 90 is pressed in the first spindle thread turn 83 near the end 86 of the thread section 82. This force action guarantees that during the subsequent rotation of the winding spindle 80, the wire 90 is forced into the spindle thread turns 83 of the thread section 82. In this way, the wound up wire 90 takes on the shape of the thread section 82, which is given by the individual spindle thread turns 83 with or without recesses 84 or bulges (not shown).

For winding the wire 90 on the thread section 82, the wire 90 is aligned perpendicular to the longitudinal axis of the winding spindle 80 (see FIG. 13). During the winding of the wire 90 on the thread section 82, the winding spindle 80 rotates about its longitudinal axis. At the same time, the winding spindle 80 is preferably moved counter to its thread direction R, in order to wind the wire 90 on the thread section 82. In the same manner, it is preferred to move the wire 90 in the thread direction R while the wire 90 is wound onto the thread section 82. According to a further preferred embodiment, it is preferred to simultaneously move the winding spindle 80 counter to the thread direction R, while the wire 90 is moved in the thread direction R.

During the winding of the wire 90 onto the thread section 82, the shape of the individual spindle thread turns 83 is impressed into the wire 90. Thereby, due to the at least one recess 84 a secant 16, or due to the elevation (not shown) the bulge 26 is created in the wire helix of the threaded element 1; 1' in number and distribution corresponding to the recesses 84 and elevations on the thread section 82.

After the wire 90 has been wound on the thread section 82, the wire helix, which later forms the threaded element 1; 1', is located on the thread section 82. Now in step W4, the wire 90 projecting perpendicular to the longitudinal axis of the winding spindle 80 is separated in order to form the threaded element 1; V. The separation can be realized using cutting, punching, shearing or breaking, for example at a previously imprinted intended break point of the wire 90. The separation in step W4 preferably occurs at the end 88 of the thread section 82.

Following subsequently in step W5, threaded element 1; 1' is preferably unwound from the thread section 82 or the winding spindle 80. The produced threaded element 1; 1' is optionally supplied to known post-processing steps corresponding to different production methods.

The next production of a threaded element 1; 1' can occur as soon as the winding spindle 80 is returned again into its starting position.

The invention claimed is:

1. An installation method for a component in an opening with an internal thread of a mating component, wherein a pitch per rotation of the internal thread is known, wherein said component includes at least one of a screw or an installation spindle with a threaded element in the shape of a wire thread insert, said threaded element comprising a plurality of adjacent helical windings, at least the radial interior of which is adapted in shape to a thread, in which at least one narrowed helical winding is composed of at least two helical winding sections, which enclose one or a plurality of adjacent secants, which constrict the narrowed helical winding radially inward, said method having the following steps:

a) screwing-in said at least one of the screw with the threaded element or the installation spindle with the threaded element into the internal thread of the opening of the mating component;

b) capturing a screw-in torque and an angle of rotation of the threaded element during said screwing-in step; and c) determining a position of the threaded element in the opening from the pitch of the internal thread and from a first covered angle of rotation after a first increase of the screw-in torque from a base screw-in torque to a first screw-in torque that signals an entry of the narrowed helical winding of the threaded element in the opening.

2. The installation method according to claim 1, including the additional steps of:

defining a maximum torque; and completing the screwing-in step upon attaining the maximum torque.

3. The installation method according to claim 1, including the further step of:

capturing a second increase of the screw-in torque that signals an arrival of a further narrowed helical winding of the threaded element; and determining the position of the threaded element in the opening of the component.

4. The installation method according to claim 1, including the additional steps of:

defining a process window with at least the limits of a minimal angle of rotation and a minimum screw-in torque;

detecting whether this process window is attained during the installation by the screw-in torque-angle of rotation curve; and rating the installation as "OK", if the process window was attained by the screw-in torque-angle of rotation curve, and rating the installation as "not OK", if the process window was not attained by the screw-in torque-angle of rotation curve.

5. The installation method according to claim 4, including the additional steps of:

defining two maximum limits of the process window with a maximum angle of rotation and a maximum screw-in torque;

capturing a progression of the screw-in torque depending on the angle of rotation within the process window; and rating the installation as "OK" if the specific previously defined conditions of the progression of the screw-in torque—angle of rotation curve are satisfied, and rating the installation as "not OK" if these conditions of the progression of the screw-in torque—angle of rotation curve are not satisfied.

6. The installation method according to claim 1, in which the threaded element has at least two narrowed helical windings which are disposed spaced from each other in the longitudinal direction of the threaded element.

7. The installation method of claim 1, in which a plurality of adjacent helical windings at the start of the threaded element seen in its thread direction, have a smaller diameter than the remaining helical windings without secant, with which the threaded element can be fastened on an element with external threads.

8. The installation method according to claim 1, in which the opening of the mating component has a cylindrical insertion surface without internal threads.

9. An installation method for a component in an opening with an internal thread of a mating component, wherein a pitch per rotation of the internal thread is known, wherein said component includes
an installation tool with a threaded element in the shape of a wire thread insert, said threaded element comprising a plurality of adjacent helical windings, the radial interior of which is adapted in shape to a thread, in which at least one widened helical winding is composed of at least two helical winding section, which enclose one or a plurality of adjacent bulges, said bulges widening the widened helical winding radial outward, said method having the following steps:
a) screwing-in said installation tool with the threaded element into the internal thread of the opening of the mating component;
b) capturing a screw-in torque and an angle of rotation of the threaded element during said screwing-in step; and
c) determining a position of the threaded element in the opening from the pitch of the internal thread and from a first covered angle of rotation after a first increase of the screw-in torque from a base screw-in torque to a first screw-in torque that signals an entry of the widened helical winding of the threaded element in the opening.

10. The installation method according to claim 9, including the additional steps of:
defining a maximum torque; and
completing the screwing-in step upon attaining the maximum torque.

11. The installation method according to claim 9, including the further step of:
capturing a second increase of the screw-in torque that signals an arrival of a further widened helical winding of the threaded element; and
determining the position of the threaded element in the opening of the component.

12. The installation method according to claim 9, including the additional steps of:
defining a process window with at least the limits of a minimal angle of rotation and a minimum screw-in torque;
detecting whether this process window is attained during the installation by the screw-in torque—angle of rotation curve; and
rating the installation as "OK", if the process window was attained by the screw-in torque—angle of rotation curve, and rating the installation as "not OK", if the process window was not attained by the screw-in torque—angle of rotation curve.

13. The installation method according to clam 12, including the additional steps of:
defining two maximum limits of the process window with a maximum angle of rotation and a maximum screw-in torque;
capturing a progression of the screw-in torque depending on the angle of rotation within the process window; and
rating the installation as "OK" if the specific previously defined conditions of the progression of the screw-in torque—angle of rotation curve are satisfied, and rating the installation as "not OK" if these conditions of the progression of the screw-in torque-angle of rotation curve are not satisified.

14. The installation method according to claim 9, in which a plurality of adjacent helical windings at the start of the threaded element seen in its thread direction, have a smaller diameter than the remaining helical windings without bulges, with which the threaded element can be fastened on an element with external threads.

15. The installation method according to claim 9, in which the opening of the mating component has a cylindrical insertion surface without internal threads.

* * * * *

UNITED STATES PATENT AND TRADEMARK OFFICE
CERTIFICATE OF CORRECTION

| | | |
|---|---|---|
| PATENT NO. | : 8,850,680 B2 | Page 1 of 1 |
| APPLICATION NO. | : 13/176185 | |
| DATED | : October 7, 2014 | |
| INVENTOR(S) | : Andreas Marxkors et al. | |

It is certified that error appears in the above-identified patent and that said Letters Patent is hereby corrected as shown below:

In the Claims:
Column 13
Line 23, please change "helical winding section, which enclose one or a plurality" to --helical winding sections, which enclose one or a plurality--

Signed and Sealed this
Twenty-seventh Day of January, 2015

Michelle K. Lee
*Deputy Director of the United States Patent and Trademark Office*